United States Patent [19]

Allen et al.

[11] Patent Number: 4,929,688

[45] Date of Patent: May 29, 1990

[54] CURE SYSTEM FOR OPEN STEAM CURING OF MINERAL-LOADED CHLOROBUTYL COMPOUNDS

[75] Inventors: Terry F. Allen; Robert C. Schisler, both of Akron, Ohio

[73] Assignee: The Goodyear Tire & Rubber Company, Akron, Ohio

[21] Appl. No.: 374,807

[22] Filed: Jul. 3, 1989

Related U.S. Application Data

[62] Division of Ser. No. 231,288, Aug. 11, 1988, Pat. No. 4,873,290.

[51] Int. Cl.$^5$ .............................................. C08C 19/26
[52] U.S. Cl. .................................. 525/332.5; 525/237; 525/332.8
[58] Field of Search ................. 525/337, 343, 346, 374

[56] References Cited

U.S. PATENT DOCUMENTS 3,865,763  2/1975  Feniak .................................. 525/337
3,968,062  7/1976  Ecsedy ............................... 525/334.1

Primary Examiner—Christopher Henderson
Attorney, Agent, or Firm—Bruce J. Hendricks

[57] ABSTRACT

There is disclosed an improved method for open steam curing of mineral-loaded elastomers. It has been discovered that use of a vulcanization agent comprising a mixture of an alkyl phenol disulfide and a guanidine compound provides a synergistic curing system that is superior over the use of either component alone. The improved curing system of the present invention is particularly suited for the open steam curing of mineral-loaded chlorobutyl compounds. The cure system may be used in addition to zinc oxide and results in excellent states of cure as determined by tensile elongation and hardness measurements.

10 Claims, No Drawings

CURE SYSTEM FOR OPEN STEAM CURING OF MINERAL-LOADED CHLOROBUTYL COMPOUNDS This is a Divisional of Application Ser. No. 07/231,288, filed Aug. 11, 1988, now U.S. Pat. No. 4,873,290.

BACKGROUND OF THE INVENTION

The present invention is concerned with the vulcanization of mineral-loaded chlorobutyl rubber. Chlorobutyl rubber possesses many desirable properties including exceptionally good air permeability, flex properties, oxygen properties and good heat resistance. The commercial success of chlorobutyl rubber is largely dependent on its application in products such as tire innerliners and side walls, conveyor or power transmission belting, hoses and wire insulation. In many of these applications the chlorobutyl rubber is mineral-loaded to further enhance the product's properties and/or lower the cost of manufacture.

Mineral-loaded chlorobutyl compounds are difficult to cure in the presence of steam. It is believed that the hydroscopic nature of the fillers cause absorption of the moisture from the steam and thus interferes with crosslinking. Unfortunately, conventional cure systems, typically employed with carbon black and dry cured mineral-loaded compounds, are ineffective for open steam curing of chlorobutyl rubber. Therefore, there exists a need for an improved curing system.

SUMMARY OF THE INVENTION

The present invention relates to an improved method for open steam curing of mineral-loaded chlorobutyl rubber. The improved method includes vulcanizing a blend of a mineral-loaded chlorobutyl rubber with a vulcanization agent containing a mixture of an alkyl phenol disulfide and a guanidine compound selected from the group consisting of diphenyl guanidine, di-ortho-tolylguanidine, triphenyl guanidine and di-ortho-tolylguanidine salt of dicatechol borate.

DETAILED DISCLOSURE OF THE INVENTION

There is disclosed a method of vulcanizing mineral-loaded chlorobutyl rubber which comprises (a) mixing mineral-loaded chlorobutyl rubber with a vulcanization agent comprising a mixture of an alkyl phenol disulfide and a guanidine compound selected from the group consisting of diphenyl guanidine, di-ortho-tolylguanidine, triphenyl guanidine and di-ortho-tolylguanidine salt of dicatechol borate and (b) vulcanizing the resultant mixture.

There is further disclosed a vulcanizable composition comprising a blend of mineral-loaded chlorobutyl rubber with a vulcanization agent comprising a mixture of an alkyl diphenol disulfide and a guanidine compound selected from the group consisting of diphenyl guanidine, di-ortho-tolylguanidine, triphenyl guanidine and di-ortho-tolylguanidine salt of dicatechol borate.

There is also disclosed the vulcanizate resulting from the vulcanizable composition recited above.

The most readily available alkyl phenol disulfides for use in the present invention are the para-tert. amyl phenol disulfides which are easily prepared from para-tert. amyl phenol. A family of para-tert. alkyl phenol disulfides that can be used in the present invention are commercially available under the registered trademark Vultac from Pennwalt Corporation. Vultac ® 2 (specific gravity ranging from 1.0–1.2 and melting point of 50°–60° C.) contains 23% sulfur and Vultac ® 3 (specific gravity ranging from 1.15–1.25 and melting point of 78°–93° C.) contains 28% sulfur. Vultac ® 4 contains 16% sulfur and is a diluted form of Vultac ® 2 that further contains 30% stearic acid. Yet another Vultac ® product that can be used in the present invention is Vultac ® 5 which contains 21% sulfur and is a diluted form of Vultac ® 3 that further contains 30% of Micro-Cel E (porous calcium silicate). Vultac ® 5 has a specific gravity ranging from about 1.34 to about 1.42, a sulfur content of about 21% and is the preferred alkyl phenol disulfide contemplated for use in the present invention. Additional alkyl phenol disulfides that may be used are Vultac ® 7 which has a sulfur level of 30.5% and Vultac ® 710 which has 27.4% sulfur. Yet another alkyl phenol disulfide that is commercially available is known as Tackine ® 30 from Monsanto. Tackine ® 30 contains 30% sulfur.

The alkyl phenol disulfide is generally present in sufficient amounts and in combination with the guanidine compound to obtain an excellent cure of the mineral-loaded chlorobutyl rubber. While the level of alkyl phenol disulfide may vary, the alkyl phenol disulfide is generally used in amounts ranging from about 0.25 to about 10 phr. Preferably, the alkyl phenol disulfide is present in amounts from about 1 to about 5 phr with a range of from 1 to about 3 phr being particularly preferred.

The guanidines which may be used in the present invention include diphenyl guanidine, di-ortho-tolylguanidine, triphenyl guanidine and the di-ortho-tolylguanidine salts of dicatechol borate. Preferably, the di-ortho-tolylguanidine salts of dicatechol borate having a specific gravity of from about 1.20 to about 1.25 are used because it results in vulcanizates of low odor particularly suited for food and beverage applications, and because it results in the most stable vulcanizate properties. A di-ortho-tolylguanidine salt of dicatechol borate was commercially available from Du Pont under the registered tradename Permalux ®. The di-ortho-tolylguanidine salt of dicatechol borate is commercially available from R. T. Vanderbilt, Inc. under the tradename Vanax PML. The di-ortho-tolylguanidine salt of dicatechol borate generally has a melting point of about 165° C. and a molecular weight of about 467. While it is known that chlorobutyl rubber vulcanizates cured with the di-ortho-tolylguanidine salts of dicatechol borate have a high degree of crosslinking, unfortunately, di-ortho-tolylguanidine salts of dicatechol borate are ineffective for open steam vulcanizing of mineral-loaded chlorobutyl compounds. It has, however, been discovered that when used as a vulcanization agent in combination with an alkyl phenol disulfide, excellent open steam curing of mineral-loaded chlorobutyl rubber is obtained. The levels of guanidine compound may vary depending on such factors as the amount of other additives, such as fillers. Generally, the guanidine compound is used in amounts ranging from about 0.25 to about 10 phr with a range of from 1 to about 5 being particularly preferred.

The weight ratio of alkyl phenol disulfide to guanidine compound may vary depending on the desired properties from the chlorobutyl vulcanizate. Generally, the weight ratio of alkyl phenol disulfide to guanidine compound ranges from about 5:1 to 1:5 with a range of from 3:1 to 1:1 being preferred. The weight ratio of alkyl phenol disulfide to guanidine compound that is particularly preferred is about 2:1.

The term "chlorobutyl" as described herein means a halogenated butyl rubber wherein the halogen is chlorine. Butyl rubber is a copolymer of from about 95.5 to about 99.5 mole percent isobutylene and from about 0.5 to about 4.5 mole percent isoprene. Chlorobutyl rubber is commercially available and may be prepared by chlorinating butyl rubber in solution containing between 1 to 60% by weight of butyl rubber in a substantially inert $C_5$–$C_8$ hydrocarbon solvent such as pentane, hexane, heptane, etc. and contacting this butyl rubber cement with chlorine gas for about 2 seconds to about 25 minutes whereby chlorobutyl rubber and hydrogen halide are formed. The preparation of chlorobutyl rubber is well known to those skilled in the art, see e.g. U.S. Pat. No. 3,099,644, which is incorporated herein by reference. Further information concerning the properties, characteristics and chemistry of vulcanization of chlorobutyl rubber may be found in Baldwin et al "Preparation and Properties of Chlorobutyl", Rubber & Plastics Age, 42, 500 (1961), the pertinent portions of which are incorporated herein by reference in their entirety. This invention is not intended to be limited in any way by the manner in which butyl rubber is chlorinated.

In general any chlorobutyl rubber can be used. Illustrative of the chlorobutyl rubber that can be used is a chlorinated butyl rubber which before chlorination analyzes 1.8 mole percent unsaturation and a viscosity average molecular weight of about 450,000. The high molecular weight butyl rubber starting material may contain from about 0.5 to about 6% of combined diolefin. A suitable commercially available chlorobutyl rubber contains from about 1.1% to about 1.35% by weight chlorine and from about 0.5 to 2 mole percent unsaturation.

The chlorobutyl rubber compound cured with the present vulcanization system contains fillers. Conventional fillers known to those skilled in the art include calcium carbonate, magnesium carbonate, magnesium silicate, calcium silicate, aluminum silicate, whiting, pyrogenic silica, hydrated silica, barium sulfate, titanium dioxide, calcium sulfate and mica. Carbon black may be used but is preferably used only in minor amounts for color. Generally speaking, the fillers may be used in amounts ranging from about 25 to about 200 phr with a range of from 50 to 100 phr being particularly preferred.

Vulcanization of mineral-loaded chlorobutyl rubber proceeds primarily through reaction of the allylic chlorine. In addition to the vulcanization agent, a cure agent such as zinc oxide is preferably used. In addition to zinc oxide, other oxides, hydroxides and carbonates of the metals in Groups I-A and II-A of Periodic Table of Elements may be used. The amount of zinc oxide or other cure agent is generally present in amounts ranging from about 2 to about 20 phr. Preferably, the cure agent is zinc oxide and is present in the vulcanizable composition in a range of from about 3 to about 7 phr.

The rubber can be prepared by blending the rubber together with all desired ingredients except the vulcanization agent of this invention in any desired fashion that allows for intimate mixing, for example, in a Banbury mixer or a two roll differential speed mill. The vulcanization agent of this invention may then be incorporated or mixed with the blended ingredients in any desired fashion such as by simply milling the blended ingredients and the vulcanization agent on a conventional rubber mill. Preferably, the milling is conducted at 50° to 90° C. Other methods of mixing the vulcanization agent with the polymer will be apparent to those skilled in the art.

Vulcanization or crosslinking is accomplished by open steam curing where the moisture contacts the rubber surface. Open steam curing generally involves pressurizing the product of vulcanizable material by placing the product in an open tray in a steam autoclave. The curing temperatures and times are well within the skill of those versed in this art and may range from about 20 minutes to several hours at a temperature of from 280° F. to about 350° F. A convenient technique for determining the rate of cure and crosslinking is by means of curometers such as the oscillating disk rheometer. The rheometer curve, taken at curing temperature, indicates the induction period, the course of crosslinking reaction, the occurrence of a plateau or reversal, and at what time optimum cure is reached. Arbitrarily, the time required to attain 90% of the maximum increase in torque over the minimum ($\Delta L_{max}$) has been set as the time for optimum cure, although sometimes other percentages are used.

In addition to the crosslinking composition of this invention, the chlorobutyl rubber may contain other ingredients commonly used in chlorobutyl formulations, for example, extenders, pigments, stabilizers, antioxidants, tackifiers, plasticizers and softeners may be added.

The following examples are presented to fully illustrate the present invention and are not intended to be limiting. All parts are given by weight unless otherwise indicated.

The chlorobutyl rubber compound that was used in the following examples contained the following parts by weight:

TABLE I

| Ingredients | Parts |
| --- | --- |
| Chlorobutyl rubber | 100.00 |
| Aluminum silicate | 30.00 |
| Magnesium silicate | 40.00 |
| Titanium dioxide | 10.00 |
| Stearic acid | 0.50 |
| EPDM | 7.00 |
| Polyethylene glycol | 1.50 |
| Polyethylene | 5.00 |
| Microcrystalline wax | 3.00 |
| | 197.00 |

EXAMPLES 1–11

The following examples were conducted in order to determine the effect on mineral-loaded chlorobutyl rubber by varying the ratio of alkyl phenol disulfide to guanidine component. Varying amounts of an alkyl phenol disulfide and/or a di-ortho-tolylguanidine salt of dicatechol borate were blended with 197 parts of the chlorobutyl rubber compound in Table I and 5.00 parts of zinc oxide. The compounds were blended in a 1100 cc volume capacity Banbury for 4 to 6 minutes until a homogeneous mixture was obtained. The varying amounts of each component of the vulcanization agent are listed below in Table II. The alkyl phenol disulfide that was used was Vultac ® 5. The di-ortho-tolylguanidine salt of dicatechol borate used in Examples 2, 6 and 10 was Permalux ®. The di-ortho-tolylguanidine salt of dicatechol borate in the remaining examples was Vanax ® PML.

TABLE II

| Example | Alkyl Phenol Disulfide | Guanidine |
| --- | --- | --- |
| 1 (Control) | 1.00 | 0 |
| 2 | 3.13 | 0.60 |
| 3 | 4.00 | 1.25 |
| 4 | 1.38 | 0.60 |
| 5 | 2.00 | 1.00 |
| 6 | 3.13 | 1.90 |
| 7 | 2.25 | 1.25 |
| 8 | 2.25 | 1.25 |
| 9 | 1.00 | 1.00 |
| 10 | 1.38 | 1.90 |
| 11 | .50 | 1.25 |

Table III below lists the physical properties resulting from hose samples prepared from each of the above 11 compounds. Scorch was determined according to ASTM D1646. Specific gravity was determined according to ASTM D297. Tensile, elongation and modulus were determined according to ASTM D412. Hardness was determined according to ASTM D2240. Tear was determined according to ASTM D624.

Tensile, elongation, modulus, diameter and die C tear were studied at 40 and 60 minute cures at 302° F. The hose samples were prepared from sheet stock approximately 0.090 inch thick. The specimens were applied to a steel mandrel and wrapped with two plies of 50 percent overlapped nylon cure tape. Curing was accomplished with steam in an autoclave maintained at 302° F.

EXAMPLES 12-19

The following examples were conducted in order to demonstrate the use of additional alkyl phenol disulfides and guanidines as a vulcanizing agent. Varying amounts of an alkyl phenol disulfide and a guanidine were blended with 197 parts of the chlorobutyl rubber compound in Table I, 5.00 parts of zinc oxide and 0.25 parts of magnesium oxide. The alkyl phenol disulfides were Vultax ® 2, 3, 4, 5, 7, and 710. The guanidines were Vanax ® PML, di-ortho-tolylguanidine (DOTG) and diphenyl guanidine (DPG). The varying amounts of each component are listed below in Table IV.

TABLE IV

|  | 12 | 13 | 14 | 15 | 16 | 17 | 18 | 19 |
| --- | --- | --- | --- | --- | --- | --- | --- | --- |
| Vanax PML | 1.00 | 1.00 | 1.00 | 1.00 | 1.00 | 1.00 |  |  |
| Vultac 2 | 2.00 |  |  |  |  |  |  |  |
| Vultac 3 |  | 2.00 |  |  |  |  |  |  |
| Vultac 4 |  |  | 2.00 |  |  |  |  |  |
| Vultac 5 |  |  |  | 2.00 |  |  | 2.00 | 2.00 |
| Vultac 7 |  |  |  |  | 2.00 |  |  |  |
| Vultac 710 |  |  |  |  |  | 2.00 |  |  |
| DPG |  |  |  |  |  |  | 1.00 |  |
| DOTG |  |  |  |  |  |  |  | 1.00 |

Table V below lists the physical properties resulting from hose samples prepared in a manner as described in Examples 1-11 from the compounds of Examples 12-19. The physical properties were measured in the same manner as in Examples 1-11.

TABLE III

| Example | 1 | 2 | 3 | 4 | 5 | 6 | 7 | 8 | 9 | 10 | 11 |
| --- | --- | --- | --- | --- | --- | --- | --- | --- | --- | --- | --- |
| Scorch, MS/250 F. |  |  |  |  |  |  |  |  |  |  |  |
| Minimum |  | 22 | 23 | 23 |  | 22 | 23 | 23 |  | 23 | 23 |
| Time to 5 point |  | 13.6 | 12.5 | 14.3 |  | 12.9 | 13.0 | 13.0 |  | 13.6 | 18.0 |
| increase (T 5) |  |  |  |  |  | 16.0 | 16.3 | 16.3 |  | 16.8 | 22.4 |
| Time to 10 point |  | 16.9 | 15.6 | 17.6 |  | 1.286 | 1.287 | 1.285 |  | 1.286 | 1.284 |
| increase (T 10) |  |  |  |  |  |  |  |  |  |  |  |
| Specific Gravity |  | 1.283 | 1.282 | 1.285 |  | 770 | 930 | 970 | No cure | 1000 | 1090 |
| Tensile, PSI |  |  |  |  |  | 715 | 830 | 845 | 850 | 800 | 1000 |
| 40 min. @ 302° F. | No cure | 1160 | 835 | 1160 | 1185 |  |  |  |  |  |  |
| 60 min. @ 302° F. | 350 | 1070 | 835 | 1141 | 990 |  |  |  |  |  |  |
| Elongation, % Ultimate |  |  |  |  |  |  |  |  |  |  |  |
| 40 min. @ 302° F. | No cure | 670 | 470 | 790 | 790 | 440 | 580 | 600 | No cure | 590 | 790 |
| 60 min. @ 302° F. | 800 | 610 | 440 | 780 | 640 | 400 | 530 | 520 | 800+ | 520 | 760 |
| 300% Modulus, PSI |  |  |  |  |  |  |  |  |  |  |  |
| 40 min. @ 302° F. |  | 410 | 570 | 330 |  | 560 | 500 | 445 |  | 465 | 322 |
| 60 min. @ 302° F. |  | 435 | 580 | 315 |  | 575 | 465 | 445 |  | 415 | 335 |
| Hardness, Shore A |  |  |  |  |  |  |  |  |  |  |  |
| 40 min. @ 302° F. | No Cure | 59 | 61 | 55 | 50 | 61 | 60 | 59 | No cure | 60 | 57 |
| 60 min. @ 302° F. | 35 | 61 | 65 | 58 | 55 | 65 | 62 | 62 | 50 | 61 | 59 |
| Tear, Die (C) PPI |  | 141 | 132 | 135 |  | 121 | 131 | 130 |  | 127 | 129 |

TABLE V

| Example | 12 | 13 | 14 | 15 | 16 | 17 | 18 | 19 |
| --- | --- | --- | --- | --- | --- | --- | --- | --- |
| Scorch, MS/250 F. |  |  |  |  |  |  |  |  |
| Minimum | 18 | 18 | 17 | 20 | 18 | 19 | 19 | 20 |
| R 20 | 0 | 0 | 0 | 0 | 0 | 0 | 0 | 0 |
| T 5 | — | — | — | — | — | — | 8 | — |
| Tensile |  |  |  |  |  |  |  |  |
| 40 min. @ 302° F. | 1106 | 960 | 925 | 1020 | 635 | 1015 | 1250 | 1000 |
| 60 min. @ 302° F. | 825 | 625 | 695 | 900 | 245 | 695 | 535 | 915 |
| Elongation, % Ultimate |  |  |  |  |  |  |  |  |
| 40 min. @ 302° F. | 660 | 570 | 740 | 700 | 710 | 610 | 750 | 850 |
| 60 min. @ 302° F. | 590 | 520 | 510 | 630 | 340 | 500 | 530 | 830 |
| 300% Modulus |  |  |  |  |  |  |  |  |
| 40 min. @ 302° F. | 220 | 420 | 260 | 325 | 130 | 350 | 230 | 58 |
| 60 min. @ 302° F. | 230 | 260 | 205 | 330 | 245 | 405 | 360 | 100 |
| Hardness |  |  |  |  |  |  |  |  |
| 40 min. @ 302° F. | 60 | 61 | 60 | 59 | 54 | 61 | 59 | 59 |

TABLE V-continued

| Example | 12 | 13 | 14 | 15 | 16 | 17 | 18 | 19 |
|---|---|---|---|---|---|---|---|---|
| 60 min. @ 302° F. | 56 | 61 | 60 | 59 | 56 | 61 | 60 | 57 |

As can be seen from the data in Table III, use of the alkyl phenol disulfide alone, see Example 1, resulted in no cure after 40 minutes at 302° F. In comparison, all of the mineral-filled chlorobutyl rubber compositions containing the vulcanization agent of the present invention, see Examples 2–19, cured after 40 minutes resulting in a variety of desirable physical properties. All of the samples in the examples were cured after 50 minutes. With respect to the tensile values, the highest values were achieved at lower concentrations of each component of the vulcanization agent. Similar to the tensile effect, elongation was maximum when each component was at a lower level. Three hundred percent modulus values were greatest at higher concentrations of both components and Shore A values increased with elevated component concentrations.

Industrial Applicability

The curing system of the instant invention will fulfill a long felt need in the industry. The industry has been long aware of the fact that mineral-loaded chlorobutyl compounds are difficult to cure in the presence of steam. The instant invention provides a solution to this problem. In addition, the curing system allows production of products such as hoses which impart little if any taste or odor to those materials conveyed therein. This is particularly important to applications directed to the food and beverage industry. The vulcanizable compositions of the present invention may also be formed into tire innerliners, tire sidewalls, conveyor belts, power transmission belts, wire insulation and sheets and roofing materials.

The features, advantages and other specific embodiments of this invention are readily apparent to those ordinarily skilled in this art. While specific embodiments of this invention have been described in considerable detail, variations and modifications of these embodiments can be affected without departing from the scope of the invention as disclosed and claimed herein.

What is claimed is:

1. A vulcanizable composition comprising a blend of chlorobutyl rubber with (1) 25 to about 200 phr of a filler selected from the group consisting of calcium carbonate, magnesium carbonate, magnesium silicate, calcium silicate, aluminum silicate, whiting, pyrogenic silica, hydrated silica, barium sulfate, calcium sulfate, titanium dioxide and mica and (2) a vulcanization agent comprising from about 0.25 to about 10 phr of an alkyl phenol disulfide and from about 0.25 to about 10 phr of a guanidine compound selected from the group consisting of diphenyl guanidine, di-ortho-tolylguanidine, triphenyl guanidine and di-ortho-tolylguanidine salt of dicatechol borate.

2. The vulcanizable composition of claim 1 wherein the vulcanization agent comprises an alkyl phenol disulfide and di-ortho-tolylguanidine salt of dicatechol borate.

3. The vulcanizable composition of claim 1 wherein the mixtures of chlorobutyl rubber and vulcanization agent additionally contains zinc oxide.

4. The vulcanizable composition of claim 1 wherein the vulcanization agent comprises from about 1 to about 5 phr of alkyl phenol disulfide and from about 1 to about 5 phr of a guanidine compound.

5. The vulcanizable composition of claim 3 wherein the zinc oxide is present in the mixture in amounts ranging from about 2 to about 20 phr.

6. The vulcanizable composition of claim 3 wherein the zinc oxide is present in the mixture in amounts ranging from about 3 to about 7 phr.

7. The vulcanizable composition of claim 1 wherein the chlorobutyl rubber is crosslinked in the presence of steam.

8. The vulcanizable composition of claim 1 wherein the alkyl phenol disulfide contains from about 16% to about 28% sulfur, has a specific gravity ranging from about 1.00 to about 1.42.

9. The vulcanizable composition of claim 1 wherein the alkyl phenol disulfide has a specific gravity ranging from about 1.34 to about 1.42.

10. The vulcanizable composition of claim 2 wherein the di-ortho-tolylguanidine salt of dicatechol borate has a specific gravity from about 1.20 to about 1.25, a melting point of about 165° C. and a molecular weight of about 467.

* * * * *